US011990072B2

(12) United States Patent
Shih

(10) Patent No.: US 11,990,072 B2
(45) Date of Patent: May 21, 2024

(54) ELECTRONIC DEVICE

(71) Applicant: InnoLux Corporation, Miao-Li County (TW)

(72) Inventor: Ching-Wen Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/699,287

(22) Filed: Mar. 21, 2022

(65) Prior Publication Data

US 2022/0343819 A1 Oct. 27, 2022

(30) Foreign Application Priority Data

Apr. 21, 2021 (CN) ......................... 202110433148.4

(51) Int. Cl.
*G09G 3/20* (2006.01)

(52) U.S. Cl.
CPC ....... *G09G 3/20* (2013.01); *G09G 2310/0289* (2013.01); *G09G 2310/08* (2013.01)

(58) Field of Classification Search
CPC ....... G09G 2310/0289; G09G 2310/08; G09G 2330/045; G09G 3/20; G09G 2310/0291; G09G 2300/0408; G09G 2330/021; G09G 2310/0264
See application file for complete search history.

(56) References Cited

U.S. PATENT DOCUMENTS

2018/0090095 A1* 3/2018 Jeon ......................... G09G 3/20
2022/0343840 A1* 10/2022 Zhao .................... G09G 3/3225

FOREIGN PATENT DOCUMENTS

TW 201123132 A 7/2011

* cited by examiner

*Primary Examiner* — Dennis P Joseph
(74) *Attorney, Agent, or Firm* — MUNCY, GEISSLER, OLDS & LOWE, P.C.

(57) ABSTRACT

An electronic device includes a circuit board, a first level shift IC and a second level shift IC. The first level shift IC and the second level shift IC are disposed on the circuit board. The first level shift IC and the second level shift IC each include a plurality of clock signal output pins and a common pin, and each clock signal output pin outputs a clock signal, wherein the common pin of the first level shift IC is electrically connected to the common pin of the second level shift IC through a conductive wire on the circuit board.

19 Claims, 4 Drawing Sheets

ELECTRONIC DEVICE

CROSS REFERENCE TO RELATED APPLICATION

This application claims the benefits of the Chinese Patent Application Serial Number 202110433148.4, filed on Apr. 21, 2021, the subject matter of which is incorporated herein by reference.

BACKGROUND

1. Field of the Disclosure

The present disclosure relates to an electronic device and, more particularly, to an electronic device with level shift integrated circuits.

2. Description of Related Art

When the size of an electronic device (such as a display device) is getting larger and larger or the frame rate is getting higher and higher, the output load of the level shift integrated circuit (LS IC) inside the electronic device will also increase, which will cause the temperature of the level shift integrated circuit during operation to gradually increase.

In addition, when the screen resolution of an electronic device (such as a display device) is getting higher and higher, the control circuit in the electronic device will increase the time for controlling the level shift integrated circuit to output more timing signals and provide the same to the driving circuit. As a result, the temperature of the level shift integrated circuit during operation will further increase, which may cause problems such as component damage or operation errors in the electronic device.

Therefore, there is a need for an improved electronic device to mitigate or obviate the aforementioned problems.

SUMMARY

The present disclosure provides an electronic device, which includes a circuit board, a first level shift integrated circuit disposed on the circuit board, and a second level shift integrated circuit disposed on the circuit board. The first level shift integrated circuit and the second level shift integrated circuit each include a plurality of clock signal output pins and a common pin, and each clock signal output pin outputs a clock signal, wherein the common pin of the first level shift integrated circuit is electrically connected to the common pin of the second level shift integrated circuit through a conductive wire on the circuit board.

Other novel features of the disclosure will become more apparent from the following detailed description when taken in conjunction with the accompanying drawings.

DETAILED DESCRIPTION OF EMBODIMENT

Figure 1:
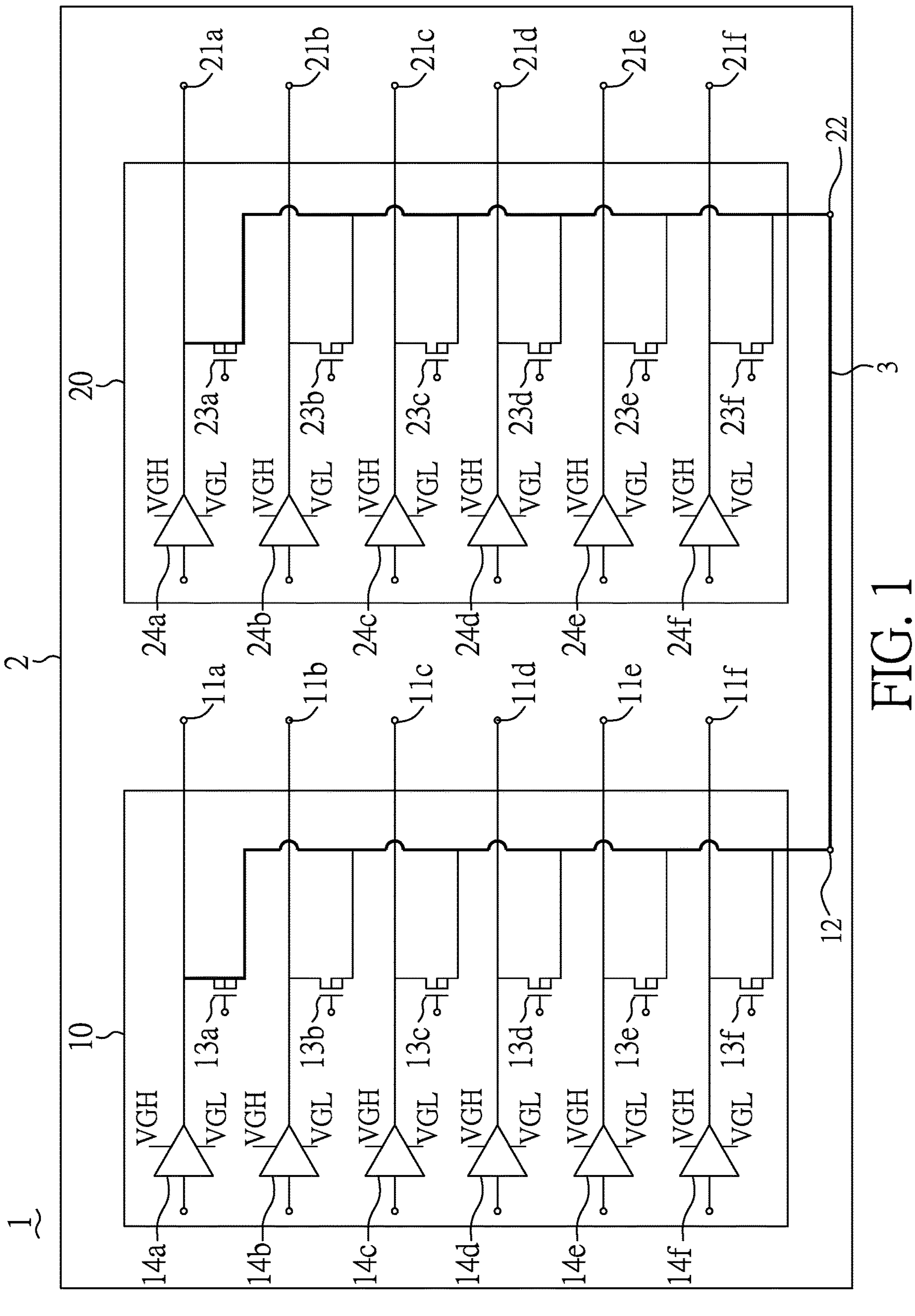
FIG. 1 is a schematic diagram of the electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

In addition, the term "adjacent" used herein may refer to describe mutual proximity and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two elements, and does not limit whether there is contact between the two elements, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection (for example, through an active component or a passive component), or a mode in which two components communicate through radio signals.

In this disclosure, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value to the second value" indicate that the range includes the first value, the second value, and other values between the first value and the second value.

In addition, each component can be implemented as a single circuit or an integrated circuit in a suitable manner, and may include one or more active components, such as transistors or logic gates, or one or more passive components, such as resistor, capacitor or inductor, but not limited thereto. The components may be connected to each other in a suitable manner, for example, respectively matching the input signal and the output signal, and using one or more lines to form a series or parallel connection. Besides, each component may allow input and output signals to enter and exit sequentially or in parallel. The aforementioned configurations are determined according to the actual application.

In addition, in this disclosure, the term such as "system", "apparatus", "device", "module" or "unit" refers to an electronic component or a digital circuit composed of multiple electronic components, an analog circuit, or other more generalized circuits, and unless otherwise specified, they do not necessarily have a hierarchical relationship.

In addition, the technical features of the different embodiments disclosed in this disclosure may be split or combined to form another embodiment.

In addition, the electronic device disclosed in the present disclosure may include a display device, an antenna device, a sensing device, a touch display device, a curved display device, or a free shape display device, but is not limited thereto. The electronic device may be a bendable or flexible electronic device. The electronic device may include, for example, liquid crystal, light emitting diode, fluorescence, phosphor, other suitable display media, or a combination thereof, but is not limited thereto. The light emitting diode may include, for example, an organic light emitting diode (OLED), a sub-millimeter light emitting diode (mini LED), a micro light emitting diode (micro LED) or a quantum dot (QD) light emitting diode (for example, QLED, QDLED) or other suitable materials or a combination thereof, but is not limited thereto. The display device may include, for example, a tiled display device, but is not limited thereto. The antenna device may be, for example, a liquid crystal antenna, but is not limited thereto. The antenna device may include, for example, a tiled antenna device, but is not limited thereto. It should be noted that the electronic device may be a combination of the foregoing, but is not limited thereto. In addition, the appearance of the electronic device may be rectangular, circular, polygonal, a shape with curved edges, or other suitable shapes. The electronic device may have peripheral systems such as a driving system, a control system, a light source system, a shelf system, etc., to support a display device, an antenna device, or a tiled device. Hereinafter, the display device will be used as an electronic device for illustrative purpose only, but the disclosure is not limited thereto.

FIG. 1 is a schematic diagram of the electronic device 1 according to an embodiment of the present disclosure. As shown in FIG. 1, the electronic device 1 includes a circuit board 2, a first level shift integrated circuit 10 and a second level shift integrated circuit 20, wherein the first level shift integrated circuit 10 and the second level shift integrated circuit 20 may be disposed on the circuit board 2.

Figure 2A:
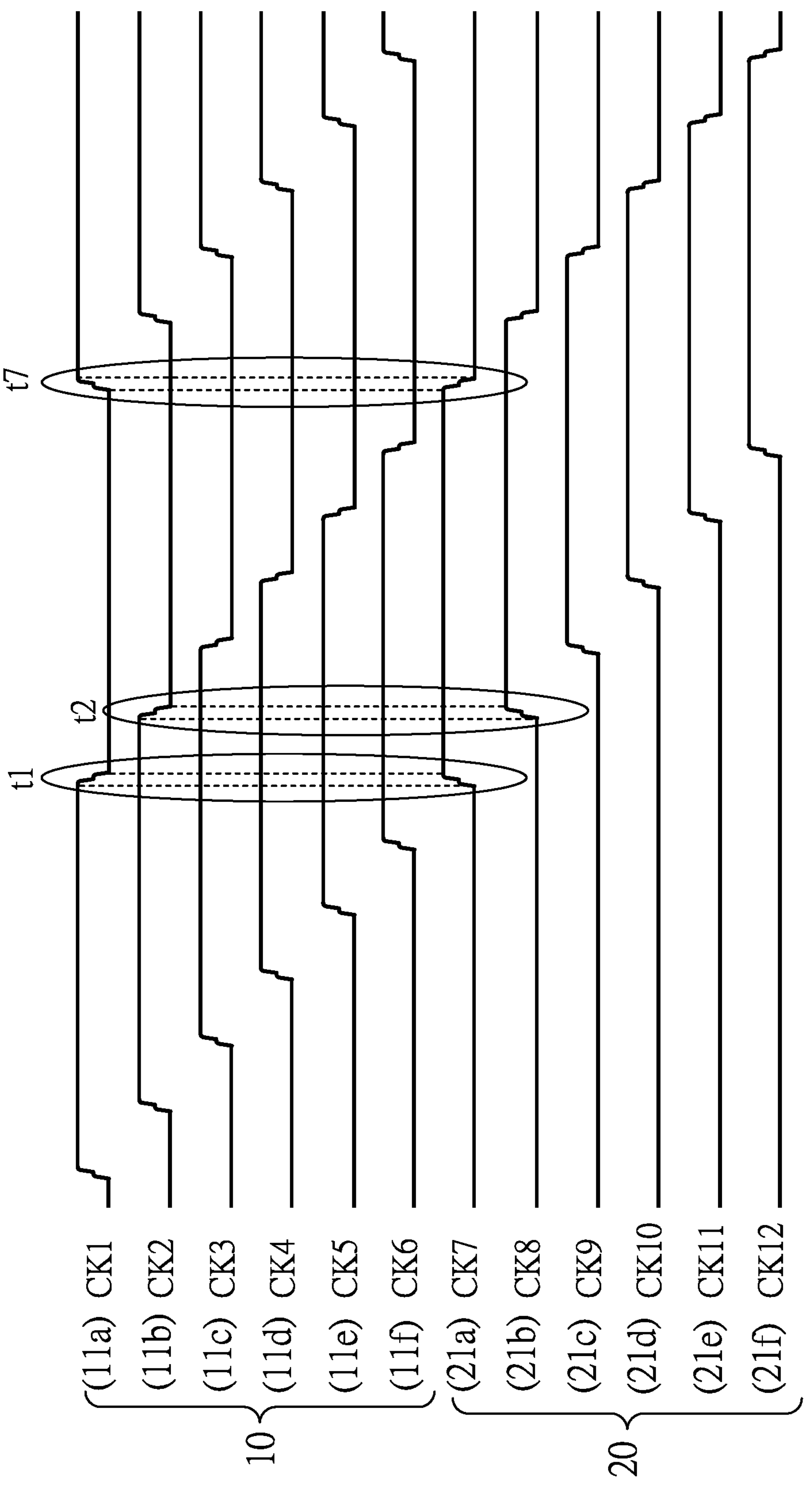
FIG. 2A is a timing diagram of the clock signals according to an embodiment of the present disclosure.

The first level shift integrated circuit 10 includes a plurality of clock signal output pins 11*a*~11*f* and a common pin 12. Each clock signal output pin 11*a*~11*f* of the first level shift integrated circuit 10 may be used to output a clock signal (for example, CK1~CK6 as shown in FIG. 2A). In this embodiment, the first level shift integrated circuit 10 may be provided with six clock signal output pins 11*a*~11*f*, but the present disclosure is not limited thereto.

The second level shift integrated circuit 20 includes a plurality of clock signal output pins 21*a*~21*f* and a common pin 22. Each clock signal output pin 21*a*~21*f* of the second level shift integrated circuit 20 may be used to output a clock signal (for example, CK7~CK12 as shown in FIG. 2A). In this embodiment, the second level shift integrated circuit 20 may be provided with six clock signal output pins 21*a*-21*f*, but the present disclosure is not limited thereto.

The common pin 12 of the first level shift integrated circuit 10 may be electrically connected to the common pin 22 of the second level shift integrated circuit 20 through a conductive wire 3 disposed on the circuit board 2, but the present disclosure is not limited thereto.

Therefore, one of the clock signal output pins 11*a*~11*f* of the first level shift integrated circuit 10 and one of the clock signal output pins 21*a*~21*f* of the second level shift integrated circuit 20 may be connected through the common pins 12, 22 so as to perform charge sharing of clock signals. Herein, "charge sharing" may be defined as when two clock signals are switched in polarity (for example, when one clock signal is transited from high voltage level to low voltage level, the other clock signal is transited from low voltage level to high voltage level), it first performs charge sharing so that part of the charges of the high-level clock signal may be shared with the low-level clock signal to decrease the voltage level of the high-level clock signal and increase the voltage level of the low-level clock signal, and then uses a control circuit (not shown) to decrease the voltage level of the high-level clock signal to a low voltage level, and increase the voltage level of the low-level clock signal to a high voltage level. As a result, the first level shift integrated circuit 10 and/or the second level shift integrated circuit 20 may shorten the time controlled by the control circuit, thereby reducing the temperature of the first level shift integrated circuit 10 and/or the second level shift integrated circuit 20 during operation.

Next, the details of each component will be described.

As shown in FIG. 1, the first level shift integrated circuit 10 may include a plurality of switches 13*a*~13*f*. In one embodiment, the number of switches 13*a*~13*f* of the first level shift integrated circuit 10 may correspond to the number of the clock signal output pins 11*a*~11*f* of the first level shift integrated circuit 10, for example, the same. By taking there being six clock signal output pins 11*a*~11*f* as an example, the number of switches 13*a*~13*f* may also be six (however, in other embodiments, it may be more than six), but it is not limited thereto. In one embodiment, in the first level shift integrated circuit 10, the clock signal output pins 11*a*~11*f* are each electrically connected to the common pin 12 through one of the switches 13*a*~13*f*. For example, the clock signal output pin 11*a* is electrically connected to the common pin 12 through the switch 13*a*, the clock signal output pin 11*b* is electrically connected to the common pin 12 through the switch 13*b*, and so on, but it is not limited thereto.

The second level shift integrated circuit 20 may also include a plurality of switches 23*a*~23*f*. In one embodiment, the number of switches 23*a*~23*f* of the second level shift integrated circuit 20 may correspond to the number of the clock signal output pins 21*a*~21*f* of the second level shift integrated circuit 20, for example, the same, but it is not limited thereto. In one embodiment, in the second level shift integrated circuit 20, the clock signal output pins 21*a*~21*f* are each electrically connected to the common pin 22 through one of the switches 23*a*~23*f*. For example, the clock signal output pin 21*a* is electrically connected to the common pin 22 through the switch 23*a*, the clock signal output pin 21*b* is electrically connected to the common pin 22 through the switch 23*b*, and so on, but it is not limited thereto.

In one embodiment, the switches 13*a*~13*f* of the first level shift integrated circuit 10 may be turned on at different times, that is, the clock signal output pins 11*a*~11*f* may be conducted with the common pin 12 at different times, respectively. In addition, the switches 23*a*~23*f* of the second level shift integrated circuit 20 may also be turned on at different times, that is, the clock signal output pins 21*a*~21*f* may be conducted with the common pin 22 at different times, respectively.

In addition, the turn-on period of one of the switches 13*a*~13*f* of the first level shift integrated circuit 10 at least partially overlaps the turn-on period of one of the switches 23*a*~23*f* of the second level shift integrated circuit 20. For example, when the switch 13*a* and the switch 23*a* are turned on, the turn-on period of the switch 13*a* at least partially overlaps the turn-on period of the switch 23*a*. At this moment, one of the clock signal output pins (for example, 11*a*) may be conducted with one of the clock signal output pins (for example, 21*a*) of the second level shift integrated circuit 20 through the switch 13*a* that is turned on, the common pin 12, the conductive wire 3, the common pin 22, and the switch 23*a* that is turned on. As a result, the clock signals (for example, CK1 and CK7 as shown in FIG. 2A) output from the two clock signal output pins (for example, 11*a* and 21*a*) may be used for charge sharing. In addition, during this period, the other switches are not turned on, thus the clock signals (for example, CK1 and CK7 as shown in FIG. 2A) of the two clock signal output pins (for example, 11*a* and 21*a*) are less affected by other clock signals, and are less likely to affect other clock signals, such as CK2~CK6 and CK8~CK12 as shown in FIG. 2A.

In one embodiment, the first level shift integrated circuit 10 may include a plurality of output stages 14*a*~14*f*. The number of the output stages 14*a*~14*f* may correspond to the number of clock signal output pins 11*a*~11*f*, but is not limited thereto. For example, each output stage 14*a*~14*f* is electrically connected to one of the clock signal output pins 11*a*~11*f*. For example, the output stage 14*a* is electrically connected to the clock signal output pin 11*a*, the output stage 14*b* is electrically connected to the clock signal output pin 11*b*, and so on, but it is not limited thereto.

In addition, each output stage 14*a*~14*f* may receive externally provided signals. For example, it may receive the high-level voltage (VGH) and low-level voltage (VGL) provided by a power managing integrated circuit (PMIC) (not shown), may receive the signal of a timing controller (not shown) as a control signal, and may transmit the high-level voltage or the low-level voltage to the corresponding clock signal output pins 11*a*~11*f* at a specific time according to the control signal. As a result, the first level shift integrated circuit 10 may generate clock signals (for example, CK1~CK6 as shown in FIG. 2A), and the clock signal output pins 11*a*~11*f* may output clock signals (for example, CK1~CK6 as shown in FIG. 2A).

In one embodiment, the second level shift integrated circuit 20 may also include a plurality of output stages 24*a*~24*f*, wherein the number of the output stages 24*a*~24*f* may correspond to the number of the clock signal output pins 21*a*~21*f*, but it is not limited thereto. For example, each output stage 24*a*~24*f* is electrically connected to one of the clock signal output pins 21*a*~21*f*. For example, the output stage 24*a* is electrically connected to the clock signal output pin 21*a*, the output stage 24*b* is electrically connected to the clock signal output pin 21*b*, and so on, but is not limited thereto.

In addition, each output stage 24*a*~24*f* may also receive externally provided signals. For example, it may receive the high-level voltage and low-level voltage provided by a power managing integrated circuit (not shown), may receive the signal of a timing controller (not shown) as a control signal, and may transmit the high-level voltage or the low-level voltage to the corresponding clock signal output pins 21*a*~21*f* at a specific time according to the control signal. As a result, the second level shift integrated circuit 20 may generate clock signals (for example, CK7~CK12 as shown in FIG. 2A), and the clock signal output pins 21*a*~21*f* may output clock signals (for example, CK7~CK12 as shown in FIG. 2A).

As a result, the structures of the first level shift integrated circuit 10 and the second level shift integrated circuit 20 can be understood.

Next, the operation process of the first level shift integrated circuit 10 and the second level shift integrated circuit 20 will be described. FIG. 2A is a signal timing diagram of the clock signals CK1~CK12 according to an embodiment of the present disclosure, and please refer to FIG. 2A and FIG. 1 at the same time.

As shown in FIG. 2A, the clock signal output pins 11*a*~11*f* of the first level shift integrated circuit 10 of this embodiment sequentially output clock signals CK1~CK6. For example, the clock signal output pin 11*a* outputs the clock signal CK1, the clock signal output pin 11*b* outputs the clock signal CK2, and so on. The clock signal output pins 21*a*~21*f* of the second level shift integrated circuit 20 sequentially output clock signals CK7~CK12. For example, the clock signal output pin 21*a* outputs the clock signal CK7, the clock signal output pin 21*b* outputs clock signal CK8, and so on. In addition, in terms of timing, the clock signal CK7 follows the clock signal CK6.

As shown in FIG. 1 and FIG. 2A, in one embodiment, through the electrical connection of the common pin 12, the conductive wire 3 and the common pin 22, the clock signal CK1 and the clock signal CK7 may perform charge sharing, the clock signal CK2 and the clock signal CK8 may perform charge sharing, the clock signal CK3 and the clock signal CK9 may perform charge sharing, the clock signal CK4 and the clock signal CK10 may perform charge sharing, the clock signal CK5 and the clock signal CK11 may perform charge sharing, and the clock signal CK6 and the clock signal CK12 may perform charge sharing It is noted that the aforementioned design nay be adjusted according to the actual requirements, and the present disclosure is not limited thereto.

Accordingly, in the period t1, the clock signal CK1 is in a step-down phase (for example, transited from a high voltage level to a low voltage level), and the clock signal CK7 is in a step-up phase (for example, transited from a low voltage level to a high voltage level). In other words, the step-down phase of the clock signal CK1 may overlap the step-up phase of the clock signal CK7. At this moment, for example, the switch 13*a* and the switch 23*a* may be turned on and the remaining switches may be turned off through the timing controller (not shown) or the internal parameter setting of the level shift integrated circuit (such as 10, 20), so as to perform charge sharing between the clock signal CK1 outputted by the first level shift integrated circuit 10 and the clock signal CK7 outputted by the second level shift integrated circuit 20, thereby reducing the amount of charges respectively required by the clock signal CK1 and the clock signal CK7 during polarity switching. As shown in FIG. 2A, due to the charge sharing between the clock signal CK1 and the clock signal CK7, the voltage of the clock signal CK1 in its step-down phase and the voltage of the clock signal CK7 in its step-up phase will, for example, form a stepped shape, but it is not limited thereto.

In the period t2, the clock signal CK2 is in the step-down phase, and the clock signal CK8 is in the step-up phase. At this moment, for example, the switch 13*b* and the switch 23*b* may be turned on, and the remaining switches may be turned off through the timing controller (not shown) or the internal parameter setting of the level shift integrated circuit (such as 10, 20), so as to perform charge sharing between the clock signal CK2 and the clock signal CK8 thereby reducing the amount of charges respectively required by the clock signal CK2 and the clock signal CK8 during polarity switching. Due to the charge sharing between the clock signal CK2 and the clock signal CK8, the voltage of the clock signal CK2 in the step-down phase and the voltage of the clock signal CK8 in the step-up phase will, for example, form a stepped shape, but it is not limited thereto.

By analogy, it is able to infer, for example, the operation of the charge sharing of the step-down phase of the clock signals CK3~CK6 and the step-up phase of the clock signals CK9~CK12.

In addition, in the period t7, the clock signal CK1 is in the step-up phase (transited from a low voltage level to a high voltage level), and the clock signal CK7 is in the step-down phase (transited from a high voltage level to a low voltage level). At this moment, for example, through the timing controller (not shown) or the internal parameter setting of the level shift integrated circuit (such as 10, 20), the switch 13*a* and the switch 23*a* can be turned on and the remaining switches can be turned off so as to perform charge sharing between the clock signal CK1 and the clock signal CK7, thereby reducing the charges to be supplied for the polarity switching of the clock signal CK1 and the clock signal CK7. Due to the charge sharing between the clock signal CK1 and the clock signal CK7, the voltage of the clock signal CK1 in the step-up phase and the voltage of the clock signal CK7 in the step-down phase will also form a stepped shape, but it is not limited thereto.

By analogy, it is able to infer the operation of the charge sharing during the step-up phase of the clock signals CK2~CK6 and the step-down phase of the clock signals CK8~CK12.

In addition, in one embodiment, the high-level voltage periods of two clock signals in the clock signals CK1 to CK12 that are successively outputted (such as CK1 and CK2, CK2 and CK3, and so on) may partially overlap with each other. In one embodiment, "partially overlap" may be defined as 10% to 95% overlap between the high-level voltage periods of the two clock signals. When the high-level voltage periods of two successive clock signals partially overlap with each other, more functions may be added to the operation of the first level shift integrated circuit 10 and the second level shift integrated circuit 20; for example, a pre-charging may be performed on the clock signal, but it is not limited thereto.

In another embodiment, the high-level voltage periods of two clock signals that are successively outputted from the clock signal output pins 11*a*~11*f* may not overlap with each other. The high-level voltage periods of two clock signals that are successively outputted from the clock signal output pins 21*a*~21*f* may not overlap with each other As a result, the operation process of the first level shift integrated circuit 10 and the second level shift integrated circuit 20 can be understood.

Figure 2B:
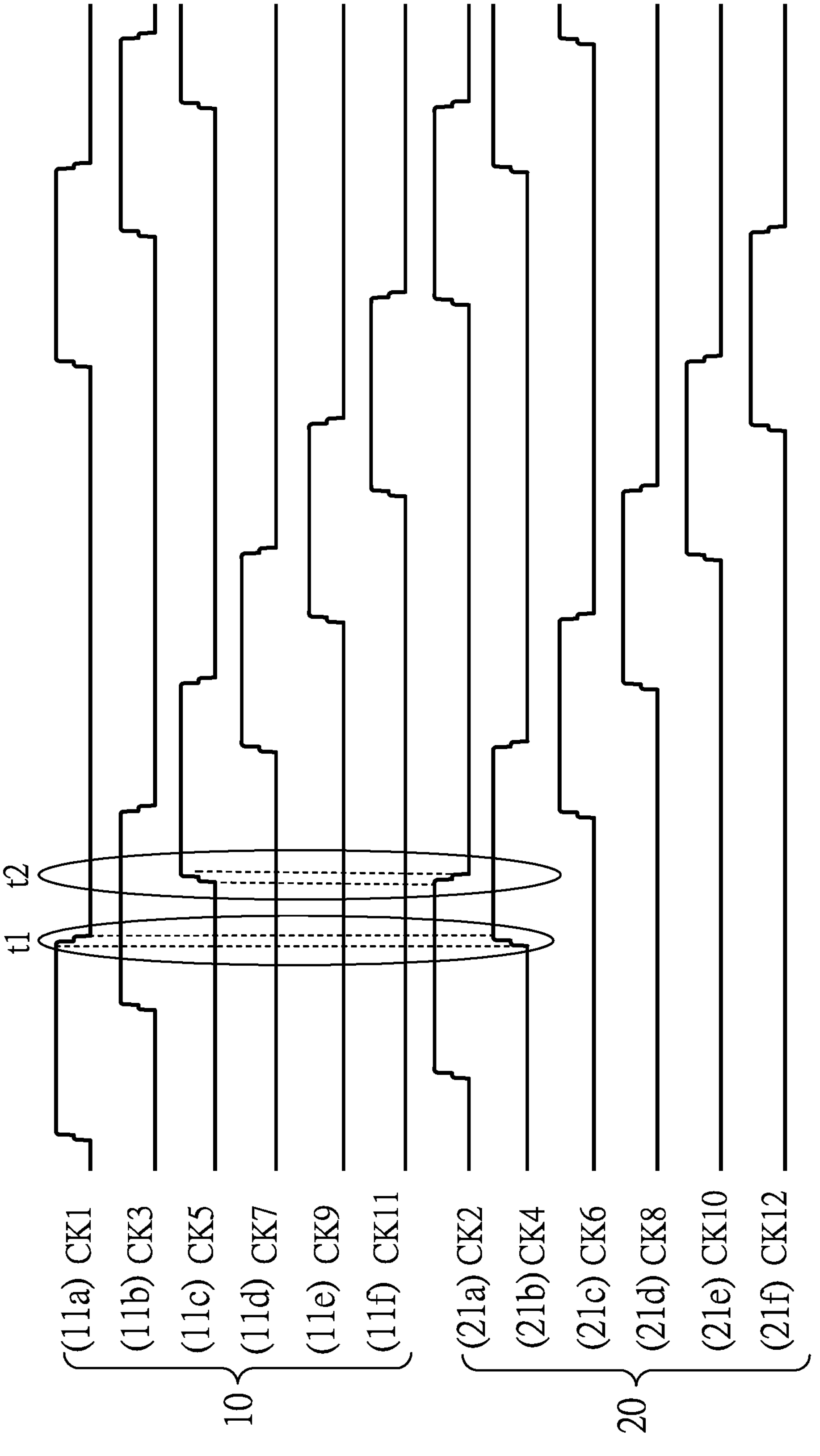
FIG. 2B is a timing diagram of the clock signals according to another embodiment of the present disclosure.

Next, another operation process of the first level shift integrated circuit 10 and the second level shift integrated circuit 20 will be described. FIG. 2B is a timing diagram of the clock signals CK1 to CK12 according to another embodiment of the disclosure, and please refer to FIG. 2B and FIG. 1 at the same time.

As shown in FIG. 1 and FIG. 2B, the clock signal output pins 11*a*~11*f* of the first level shift integrated circuit 10 and the clock signal output pins 21*a*~21*f* of the second level shift integrated circuit 20 alternately output clock signals CK1~CK12 in turn. For example, the clock signal output pin 11*a* outputs the clock signal CK1, then the clock signal output pin 21*a* outputs the clock signal CK2, then the clock signal output pin 11*b* outputs the clock signal CK3, then the clock signal output pin 21*b* outputs the clock signal CK4, and so on.

As shown in FIG. 2B, in one embodiment, charge sharing may be performed between the step-down phase of the clock signal CK1 and the step-up phase of the clock signal CK4, charge sharing may be performed between the step-down phase of the clock signal CK2 and the step-up phase of the clock signal CK5, charge sharing may be performed between the step-down phase of the clock signal CK3 and the step-up phase of the clock signal CK6, charge sharing may be performed between the step-down phase of the clock signal CK4 and the step-up phase of the clock signal CK7, charge sharing may be performed between the step-down phase of the clock signal CK5 and the step-up phase of the clock signal CK8, charge sharing may be performed between the step-down phase of the clock signal CK6 and the step-up phase of the clock signal CK9, charge sharing may be performed between the step-down phase of the clock signal CK7 and the step-up phase of the clock signal CK10, charge sharing may be performed between the step-down phase of the clock signal CK8 and the step-up phase of the clock signal CK11, charge sharing may be performed between the step-down phase of the clock signal CK9 and the step-up phase of the clock signal CK12, charge sharing may be performed between the step-down phase of the clock signal CK10 and the step-up phase of the clock signal CK1, charge sharing may be performed between the step-down phase of the clock signal CK11 and the step-up phase of the clock signal CK2, and charge sharing may be performed between the step-down phase of the clock signal CK12 and the step-up phase of the clock signal CK3. However, the present disclosure is not limited thereto.

For example, in the period t1, the clock signal CK1 is in the step-down phase and the clock signal CK4 is in the step-up phase (that is, the step-up phase of the clock signal CK4 overlaps the step-down phase of the clock signal CK1). At this moment, through the timing controller (not shown) or the internal parameter setting of the level shift integrated circuit (such as 10, 20), the switch 13*a* and the switch 23*b* may be turned on and remaining switches may be turned off, so as to perform charge sharing between the clock signal CK1 and the clock signal CK4 thereby reducing the charges to be supplied for the polarity switching of the clock signal CK1 and the clock signal CK4. Due to the charge sharing between the clock signal CK1 and the clock signal CK4, the voltage of the clock signal CK1 in the step-down phase and the voltage of the clock signal CK4 in the step-up phase of the clock signal CK1 will, for example, form a stepped shape, but it is not limited thereto.

Similarly, in the period t2, the clock signal CK2 is in the step-down phase and the clock signal CK5 is in the step-up phase. At this moment, through the timing controller (not shown) or the internal parameter setting of the level shift integrated circuit (for example, 10, 20), the switch 23*a* and the switch 13*c* may be turned on and the remaining switches may be turned off so as to perform charge sharing between the clock signal CK2 outputted by the second level shift integrated circuit 20 and the clock signal CK5 outputted by the first level shift integrated circuit 10, thereby reducing the charge to be supplied for the polarity switching of the clock signal CK2 and the clock signal CK5. Due to the charge sharing between the clock signal CK2 and the charge signal CK5, the voltage of the clock signal CK2 in the step-down phase and the voltage of the clock signal CK5 in the step-up phase will, for example, form a stepped shape, but it is not limited thereto.

By analogy, it is able to infer the operation of the charge sharing between the first level shift integrated circuit 10 and the second level shift integrated circuit 20 during the remaining periods.

In addition, similar to the embodiment of FIG. 2A, in the embodiment of FIG. 2B, the operating periods of two successive clock signals (such as CK1 and CK2, CK2 and CK3 . . . etc.) in the clock signals CK1~CK12 may partially overlap with each other, but may also do not overlap with each other.

As a result, another operation process of the first level shift integrated circuit 10 and the second level shift integrated circuit 20 can be understood.

Figure 3:
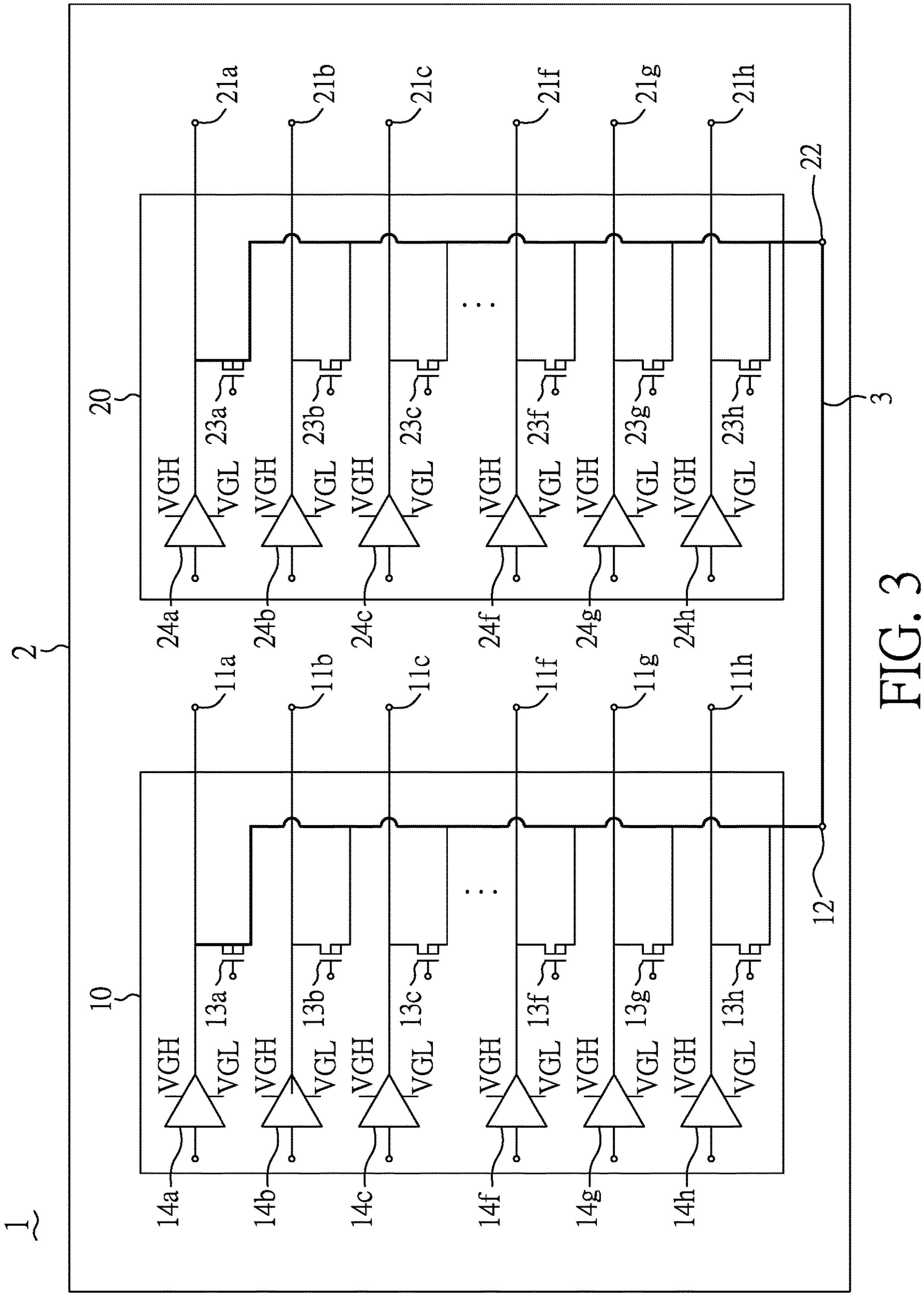
FIG. 3 is a schematic diagram of the electronic device according to another embodiment of the present disclosure.

In addition, the electronic device 1 may be implemented in different manners. For example, the number of clock signal output pins of the first level shift integrated circuit 10 and the number of clock signal output pins of the second level shift integrated circuit 20 may be changed. FIG. 3 is a schematic diagram of the electronic device according to another embodiment of the present disclosure, and please refer to FIG. 3 and FIGS. 1 to 2B at the same time.

Part of the structure of the embodiment in FIG. 3 can be known from the description of the embodiment in FIG. 1, and thus only the differences therebetween are described in the following.

As shown in FIG. 3, the first level shift integrated circuit 10 may include a common pin 12, eight clock signal output pins 11*a*~11*h*, eight switches 13*a*~13*h*, and eight output stages 14*a*~14*h*. The level shift integrated circuit 20 may include a common pin 22, eight clock signal output pins 21*a*~21*h*, eight switches 23*a*~23*h*, and eight output stages 24*a*~24*h*. The connection mode for each component can be known from the description of the embodiment of FIG. 1, and thus a detailed description is deemed unnecessary.

In addition, the operation process of the first level shift integrated circuit 10 and the second level shift integrated circuit 20 of the embodiment of FIG. 3 may be implemented similar to the embodiment of FIG. 2A. For example, the clock signal output pins 11*a*~11*h* of the first level shift integrated circuit 10 may sequentially output clock signals CK1~CK8, and the clock signal output pins 21*a*~21*h* of the second level shift integrated circuit 20 may sequentially output clock signals CK9~CK16.

In this case, one of the clock signals outputted by the clock signal output pins 11*a*~11*h* and one of the clock signals outputted by the clock signal output pins 21*a*~21*h* may perform charge sharing through the electrical connection between the common pin 12 and the common pin 22 and whether to turn on the switches 13*a*~13*h* and the switches 23*a*~23*h* or not. For example, charge sharing may be performed between the clock signal CK1 and the clock signal CK9, charge sharing may be performed between the clock signal CK2 and the clock signal CK10, charge sharing may be performed between the clock signal CK3 and the clock signal CK11, and so on, while the details can be inferred from the description of FIG. 2A and thus a detailed description is deemed unnecessary.

In addition, the operation process of the first level shift integrated circuit 10 and the second level shift integrated circuit 20 of the embodiment of FIG. 3 may be implemented similar to the embodiment of FIG. 2B. For example, the clock signal output pins 11*a*~11*h* of the first level shift integrated circuit 10 and the clock signal output pins 21*a*~21*h* of the second level shift integrated circuit 20 may alternately output clock signals CK1~CK16. In specific illustration, the clock signal output pin 11*a* may output the clock signal CK1, the clock signal output pin 21*a* may output the clock signal CK2, the clock signal output pin 11*b* may output the clock signal CK3, the clock signal output pin 21*b* may output the clock signal CK4, and so on.

In this case, one of the clock signals outputted by the clock signal output pins 11*a*~11*h* and one of the clock signals outputted by the clock signal output pins 21*a*~21*h* may perform charge sharing through the electrical connection between the common pin 12 and the common pin 22 and whether to turn on the switches 13*a*~13*h* and the switches 23*a*~23*h* or not, while the details for this case can be inferred from the description of FIG. 2B and thus a detailed description is deemed unnecessary.

It is noted that the number of timing signal output pins included in the first level shift integrated circuit 10 and the second level shift integrated circuit 20 of the aforementioned embodiments is only an example, but not a limitation of the present disclosure.

In addition, in one embodiment, the electronic device 1 manufactured in the aforementioned embodiments may be used as a touch device. Furthermore, if the electronic device 1 manufactured in the aforementioned embodiments is a display device or a touch display device, it may be applied to any products known in the art that require a display screen for displaying images, such as displays, mobile phones, notebook computers, video cameras, digital cameras, music players, mobile navigation devices, TVs, car dashboards, center consoles, electronic rearview mirrors, head-up displays, etc.

In addition, in one embodiment, the present disclosure may at least be used as proof of whether the object falls within the scope of patent protection by comparing the presence or absence of components in the electronic device 1 and the connection method, but it is not limited thereto.

Accordingly, the present disclosure provides an improved electronic device that may realize charge sharing between two level shift integrated circuits, which can shorten the time for the level shift integrated circuit to be controlled by the control circuit, so as to reduce the temperature of the level shift integrated circuit during operation.

The features of the embodiments disclosed in the present disclosure may be mixed and matched arbitrarily as long as they do not violate the spirit of the present disclosure or conflict with each other.

The aforementioned specific embodiments should be construed as merely illustrative, and not limiting the rest of the present disclosure in any way.

What is claimed is:

1. An electronic device, comprising:
- a circuit board;
- a first level shift integrated circuit disposed on the circuit board; and
- a second level shift integrated circuit disposed on the circuit board;
- wherein each of the first level shift integrated circuit and the second level shift integrated circuit includes a plurality of clock signal output pins and a common pin, and each clock signal output pin outputs a clock signal;
- wherein the common pin of the first level shift integrated circuit is electrically connected to the common pin of the second level shift integrated circuit through a conductive wire on the circuit board;
- wherein each clock signal includes a step-up phase and a step-down phase, and the step-down phase of a clock signal outputted from a clock signal output pin of the first level shift integrated circuit overlaps the step-up phase of a clock signal outputted from a clock signal output pin of the second level shift integrated circuit for realizing charge sharing between the first level shift integrated circuit and the second level shift integrated circuit.

2. The electronic device of claim 1, wherein the plurality of clock signal output pins of the first level shift integrated circuit output the clock signals in sequence.

3. The electronic device of claim 2, wherein the plurality of clock signal output pins of the second level shift integrated circuit output the clock signals in sequence, and the clock signal first outputted by the second level shift integrated circuit follows the clock signal last outputted by the first level shift integrated circuit.

4. The electronic device of claim 1, wherein the plurality of clock signal output pins of the first level shift integrated circuit and the plurality of clock signal output pins of the second level shift integrated circuit alternately output the clock signals.

5. The electronic device of claim 1, wherein voltage of the step-up phase or the step-down phase forms a stepped shape.

6. The electronic device of claim 1, wherein each of the first level shift integrated circuit and the second level shift integrated circuit includes a plurality of switches, wherein a number of the plurality of switches of the first level shift integrated circuit or the second level shift integrated circuit is the same as a number of the plurality of clock signal output pins.

7. The electronic device of claim 6, wherein in the first level shift integrated circuit, each of the plurality of clock signal output pins is electrically connected to the common pin through one of the switches.

8. The electronic device of claim 7, wherein the plurality of switches of the first level shift integrated circuit are turned on at different times, respectively, so that the plurality of clock signal output pins of the first level shift integrated circuit are conducted with the common pin at different times, respectively.

9. The electronic device of claim 6, wherein in the second level shift integrated circuit, each of the plurality of clock signal output pins is electrically connected to the common pin through one of the switches.

10. The electronic device of claim 9, wherein the plurality of switches of the second level shift integrated circuit are turned on at different times, respectively, so that the plurality of clock signal output pins of the second level shift integrated circuit are conducted with the common pin at different times, respectively.

11. The electronic device of claim 6, wherein a turn-on period of one of the switches of the first level shift integrated circuit at least partially overlaps a turn-on period of one of the switches of the second level shift integrated circuit.

12. The electronic device of claim 1, wherein high-level voltage periods of two successive clock signals outputted from the plurality of clock signal output pins of the first level shift integrated circuit are partially overlapped with each other.

13. The electronic device of claim 1, wherein each of the first level shift integrated circuit and the second level shift integrated circuit includes a plurality of output stages, a number of the output stages of the first level shift integrated circuit or the second level shift integrated circuit corresponds to a number of the clock signal output pins of the first level shift integrated circuit or the second level shift integrated circuit.

14. The electronic device of claim 13, wherein in the first level shift integrated circuit, each output stage is electrically connected to one of the plurality of clock signal output pins.

15. The electronic device of claim 14, wherein each output stage receives externally provided signals.

16. The electronic device of claim 13, wherein in the second level shift integrated circuit, each output stage is electrically connected to one of the plurality of clock signal output pins.

17. The electronic device of claim 16, wherein each output stage receives externally provided signals.

18. The electronic device of claim 1, wherein each clock signal includes a step-up phase and a step-down phase, and the step-up phase of a clock signal outputted from a clock signal output pin of the first level shift integrated circuit overlaps the step-down phase of a clock signal outputted from a clock signal output pin of the second level shift integrated circuit.

19. The electronic device of claim 18, wherein a voltage of the step-up phase or the step-down phase has a stepped shape.

* * * * *